A. F. LIDEN.
BORING BAR.
APPLICATION FILED FEB. 13, 1909.
943,088.
Patented Dec. 14, 1909.
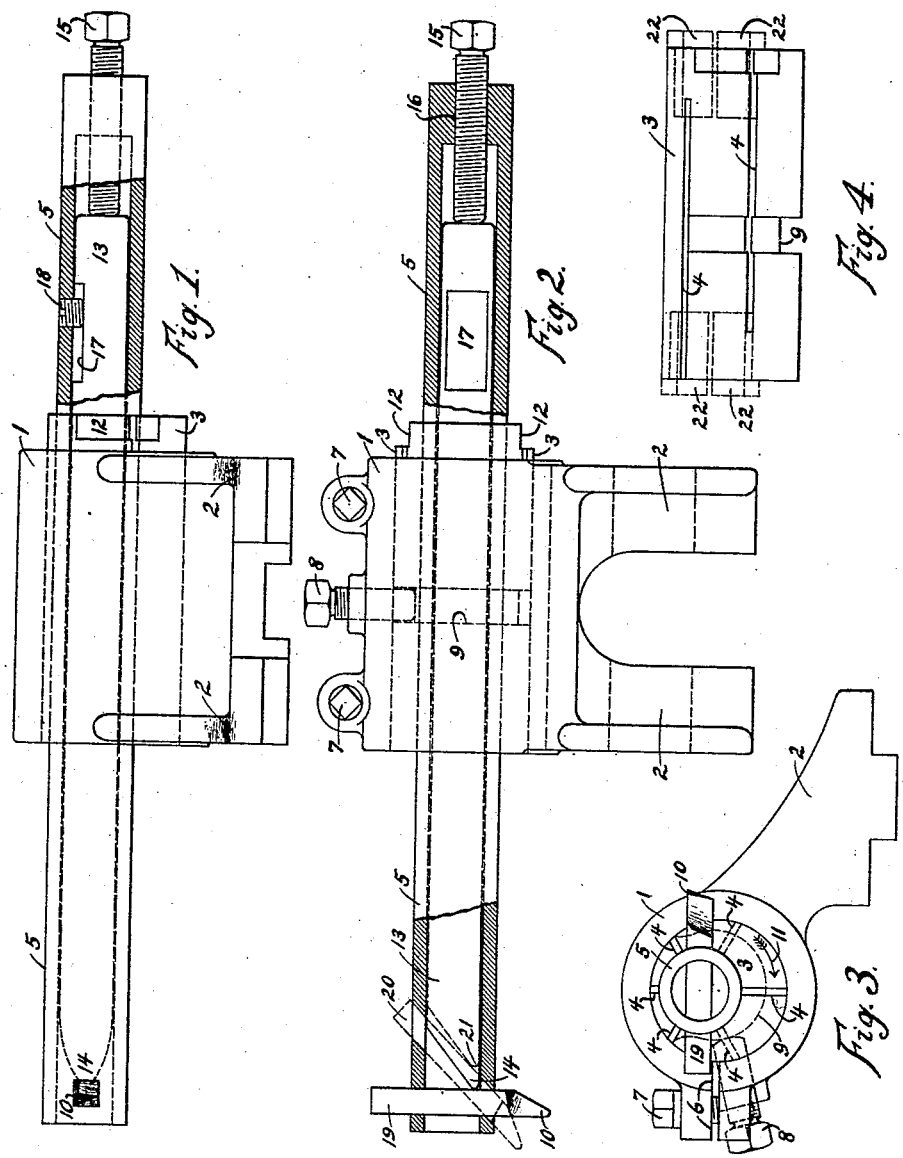
WITNESSES:
Constan Carlson
O.J. Nothenberg, M.D.
INVENTOR:
GUST FERDINAND LIDEN
BY Frederick R. Parker
ATTORNEY.

UNITED STATES PATENT OFFICE.

AUGUST FERDINAND LIDEN, OF CHICAGO, ILLINOIS.

BORING-BAR.

943,088.  Specification of Letters Patent.  Patented Dec. 14, 1909.

Application filed February 13, 1909. Serial No. 477,713.

*To all whom it may concern:*

Be it known that I, AUGUST FERDINAND LIDEN, a subject of the King of Sweden, residing at Chicago, in the county of Cook and State of Illinois, have invented a new and useful Boring-Bar, of which the following is a specification, reference being had to the accompanying drawings, illustrating same.

My invention relates to boring bars used on lathes or other suitable machines.

The principal objects of my invention are to provide improved means for clamping the cutting bit in place in a boring bar, in a plurality of positions; to provide improved means for clamping the bar in its carriage, and for securing the bar against turning in its carriage; and to provide improved means for adjusting the position of the bar relatively to the carriage.

Other objects will be apparent from the following specification.

In the accompanying drawings illustrating the preferred form of my invention, Figure 1 is a side elevation of the improved boring bar and its carriage, with portions shown in cross-section; Fig. 2 is a plan view of the device shown in Fig. 1, with portions shown in cross-section; Fig. 3 is an end elevation of the device shown in Figs. 1 and 2; and Fig. 4 is a side elevation of the eccentric bushing used in the boring-bar carriage.

Like characters refer to like parts in the several figures.

In the drawings the carriage is shown as having a hub 1 and suitable legs 2 2 carrying the hub and constructed to be suitably movable along the bed of a lathe or other suitable machine. The method of supporting the carriage relatively to the bed of a lathe is believed to be well understood. Within the hub 1 is carried a bushing 3 which is preferably split from opposite ends as shown at 4 4 in Fig. 4, to allow the bushing 3 to be tightly clamped around the bar 5 which is extended eccentrically through the bushing 3. The hub 1 is split as at 6 so as to permit of being tightly clamped around the bushing 3, the hub 1 being provided with bolts 7 7 for tightly clamping it around the bushing 3 in a manner well understood. The hub 1 is also provided with a set-screw 8 adapted to fit in a transverse channel 9 in the bushing 3 to lock the latter against turning in the hub 1. The channel 9 is formed eccentrically, relatively to the hub 1, as shown in Fig. 3, so that any turning of the bushing 3 within the hub 1, in the direction of arrow 11, produced by undue pressure on the cutting bit 10 of the boring bar when the latter is in service, will tend to tighten the inner surface of the channel portion 9 against the set-screw 8. The bar 5 is placed eccentrically through the bushing 3, as shown in Fig. 3, so that by turning the bushing 3 within the hub 1 the height of the bar 5 above the lathe bed can be suitably regulated as desired. It will also be seen that this arrangement permits of a side adjustment of the bar 5, as well as a vertical adjustment thereof. The bushing 3 is preferably flattened at one end as at 12 12, so that it can be easily grasped by a wrench if desired.

The cutting bit 10 is inserted through one end of the hollow bar 5 as shown in Figs. 1 and 2, and is suitably held in place by a rod 13 within the hollow bar 5, which rod 13 is provided with a nose 14, preferably toward one side thereof as shown, adapted to be tightly clamped against the bit 10 by a clamping screw 15 at the opposite end of the bar 5, as shown in Figs. 1 and 2. The clamping screw 15 is screwed through the end 16 of the bar 5 preferably as shown, and is preferably separate from the rod 13, the latter being removable from the hollow bar 5 when the bit 10 is removed.

It will readily be seen that the bit 10 may be easily loosened by simply unscrewing the clamping screw 15. The rod 13 is preferably flattened as at 17 to coöperate with the inner end of a set-screw 18 carried by the bar 5, preferably as shown in Fig. 1, for the purpose of preventing the rod 13 from turning within the bar 5 especially when it is being adjusted by the clamping screw 15. When such adjustment is being made the set-screw 18 is not clamped tightly against the surface 17 of the rod 13.

The cutting bit 10 may be inserted squarely through the bar 5, as shown in the position 19 of Fig. 2, or it may be inserted obliquely through the bar 5, as shown at 20 in Fig. 2, the bar 5 being suitably provided with holes through the wall thereof as shown in Fig. 2, to permit such positioning of the bit 10. Whether the bit 10 is placed squarely through the bar 5 or obliquely therethrough, the nose 14 of the rod 13 serves the same purpose of securely clamping the bit 10 in place; in the position 20 the nose 14 taking the position 21 as shown in Fig. 2. This construction provides a very simple and efficient means for readily clamping the cutting bit in place relatively to the bar 5, in a plurality of positions. The improvements of such a construction are very apparent.

I desire it to be understood that I may use split secondary bushings 22 22 in the primary bushing 3, if desired, so that various sizes of bars 5 may be used with a single primary bushing 3.

I do not wish to limit this invention to all of the exact details of construction herein shown, as various modifications of same may be made without departing from the scope of the appended claims.

What I claim as my invention is:

1. A device of the character described comprising a carriage having a hub thereon, a bushing carried within the said hub, a boring bar extending through the said bushing, the latter having a transverse eccentric channel therein, and a set-screw carried by the said hub and coöperating with the said channel whereby any turning of the said bushing within the hub during the operation of the device tends to tighten the said set-screw against the said channel portion for purposes substantially as described.

2. A device of the character described comprising a carriage having a hub thereon, a bushing carried within the said hub, a boring bar extending through the said bushing eccentrically whereby the position of the said bar relatively to the carriage may be adjusted as desired, the said bushing having a transverse eccentric channel therein, and a set-screw carried by the said hub and coöperating with the said channel whereby any turning of the said bushing within the hub during the operation of the device tends to tighten the said set-screw against the said channel portion for purposes substantially as described.

3. An adjustable support comprising a hub, a bushing carried within the hub, a transverse eccentric channel in the bushing, and a member carried by the hub and coöperating with the said channel whereby any turning of the said bushing within the hub tends to tighten the said member against the said channel portion for purposes substantially as described.

4. A boring bar comprising a tube having a plurality of holes through the wall thereof near one end thereof to accommodate a bit in a plurality of angular positions relatively to the tube, a bit adapted to be inserted through the said holes in each of the said positions, one of the said holes being common to each of the said positions, a rod carried within the said tube and having a nose adapted to bear against the said bit to clamp the latter in place in each of the said positions, and means for tightening the nose of the said rod against the said bit in each of its said positions for securely clamping the bit in place.

5. A boring bar comprising a tube having a plurality of holes through the wall thereof near one end thereof to accommodate a bit in either a square or an oblique position relatively to the tube, a bit adapted to be inserted through the said holes in each of the said positions, one of the said holes being common to both of the said positions, a rod carried within the said tube and having a nose adapted to bear against the said bit to clamp the latter in place in each of the said positions, and means for tightening the nose of the said rod against the said bit in each of its said positions for securely clamping the bit in place.

As inventor of the foregoing I hereunto subscribe my name this 10th day of February, 1909.

GUST FERDINAND LIDEN.

Witnesses:
CONSTAN CARLSON,
O. J. NOTHENBERG.